US010339586B1

(12) United States Patent
Khobragade et al.

(10) Patent No.: US 10,339,586 B1
(45) Date of Patent: Jul. 2, 2019

(54) TECHNIQUES FOR IDENTIFYING SIMILAR PRODUCTS

(71) Applicant: Amazon Technologies, Inc., Reno, NV (US)

(72) Inventors: Samir Bhayyaji Khobragade, Bothell, WA (US); Qian Chen, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1429 days.

(21) Appl. No.: 13/974,877

(22) Filed: Aug. 23, 2013

(51) Int. Cl.
*G06Q 30/06* (2012.01)

(52) U.S. Cl.
CPC .................. *G06Q 30/0631* (2013.01)

(58) Field of Classification Search
CPC ... G06F 16/248; G06F 16/9535; G06Q 50/01; G06Q 30/0631
See application file for complete search history.

(56) References Cited

U.S. PATENT DOCUMENTS 8,185,487 B2 *  5/2012  Tuzhilin ............. G06Q 30/0631
                                                          706/47
2004/0059626 A1 *  3/2004  Smallwood ............ G06Q 30/02
                                                          705/7.29
2010/0268661 A1 * 10/2010  Levy ....................... G06Q 30/02
                                                          705/347

FOREIGN PATENT DOCUMENTS

EP            2207348 A2 *   7/2010  ............. G06Q 30/02

OTHER PUBLICATIONS

Rajaraman, Anand, and Jeffrey David Ullman. "Mining of massive datasets." (2011).*
Anand Rajaraman & Jeffrey D. Ullman, Mining of Massive Datasets (Year: 2011).*

* cited by examiner

*Primary Examiner* — Bennett M Sigmond
*Assistant Examiner* — James H Miller
(74) *Attorney, Agent, or Firm* — Weaver Austin Villeneuve & Sampson LLP

(57) ABSTRACT

Methods and apparatus are described for identifying similar products or services for the purpose of making relevant recommendations to an online consumer. Products and services are represented by associated vectors which include values for each of a plurality of attributes of the corresponding product or service. One or more similar products or services are identified relative to a reference product or service set with reference to the distance between the end points of the respective vectors in the associated vector space.

24 Claims, 3 Drawing Sheets

TECHNIQUES FOR IDENTIFYING SIMILAR PRODUCTS

BACKGROUND

Online commerce continues to supplant traditional brick-and-mortar shopping at a rapid pace. The success of online merchants and marketers is increasingly dependent on the ability to identify and present products and services to individual consumers that are specifically relevant to the needs and interests of each. Conventional product recommendation techniques generally rely on data relating to consumer demographics, online behavior tracking, and previous purchases to determine what products and services might be of interest to a particular consumer. While there has been some success using such techniques, further improvement is generally desired. Not only would online merchants and marketers like to be able to identify the category of products or services a consumer wants, but also the most relevant range of options within that category.

DETAILED DESCRIPTION

This disclosure describes techniques for identifying similar products or services for the purpose of making relevant recommendations to an online consumer. It should be noted that the terms "product" and "service" are intended to capture virtually anything a user is able to purchase or access online. Further, for the sake of brevity and clarity, this disclosure will primarily use the term "product." However, it should be understood that the described concepts and techniques apply equally to services. According to such techniques, products are represented by associated product vectors which include values for each of a plurality of product attributes. Once one or more reference products are identified, one or more similar products may be identified with reference to the distance(s) between the end points of the respective product vectors in the associated vector space.

For example, if a user is shopping online for a smart phone, she might enter a search term for a particular smart phone model, manufacturer, or telecommunications service provider. While the search results will be relevant to the search term entered, they may not include results for similar smart phones from other manufacturers or service providers that might nevertheless be of interest to the user. According to the techniques described herein, similar smart phones can be identified by finding the associated product vectors that are closest in the smart phone vector space to the product vector associated with the smart phone the user is currently viewing. The user can be given the option of viewing the similar products by, for example, presentation of a selectable control in conjunction with the representation of the current search results. Further, the process may be iterated, allowing the user to continue to look for further similar options. And as will be discussed, such further options might be identified by dynamically adjusting process parameters (e.g., vector value weights) in response to user actions.

Figure 1:
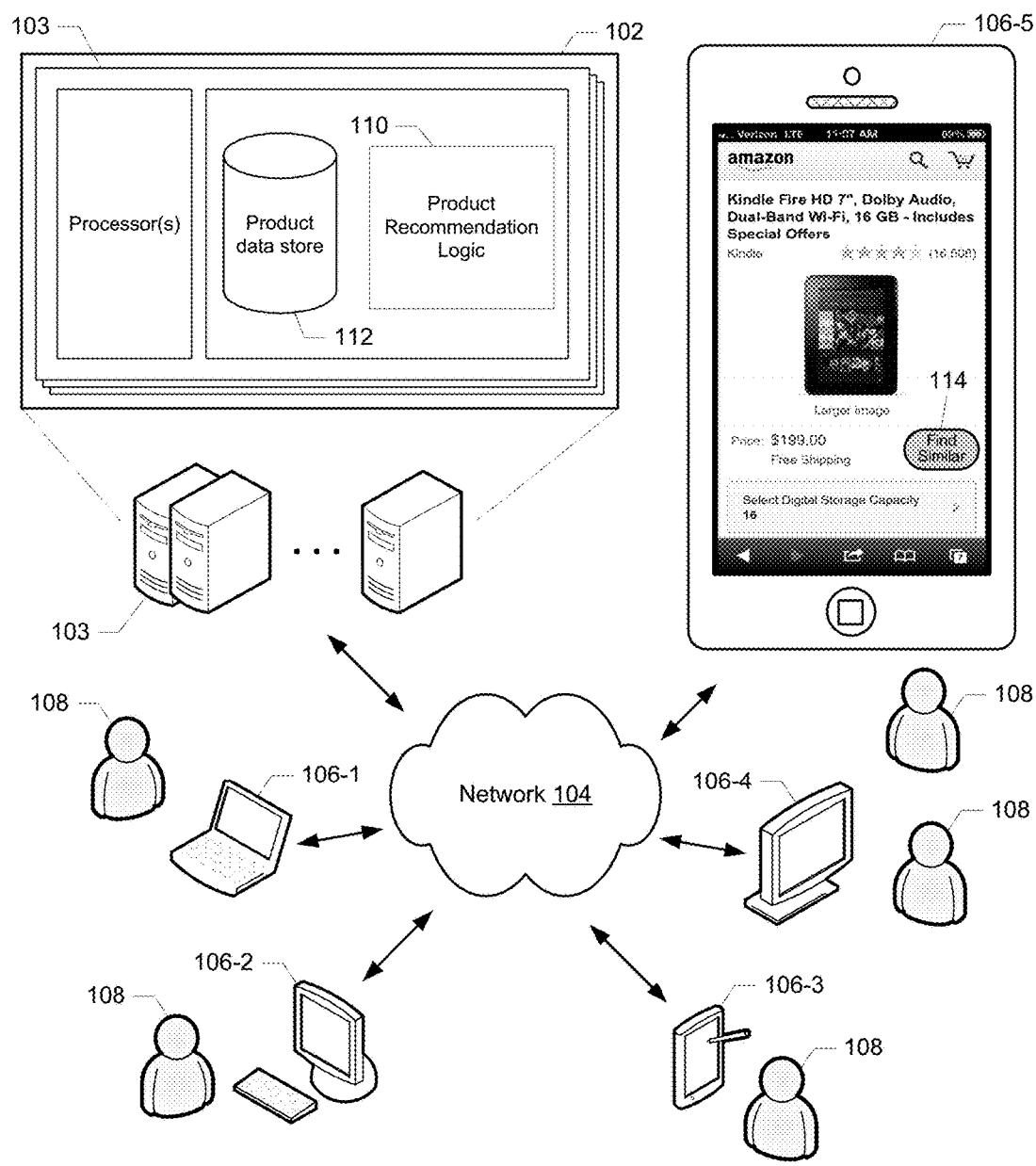
FIG. 1 illustrates an example of a computing environment in which product recommendations may be provided as described herein.

FIG. 1 illustrates an example of a computing environment in which product recommendations may be made by service 102 via network 104 to a variety of client devices (106-1 through 106-5) associated with users 108. Service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by content service 102. Such device may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc. In addition, at least some of the examples described herein contemplate various distributed computing implementations. The term "distributed computing" refers to computing models for enabling ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Figure 2:
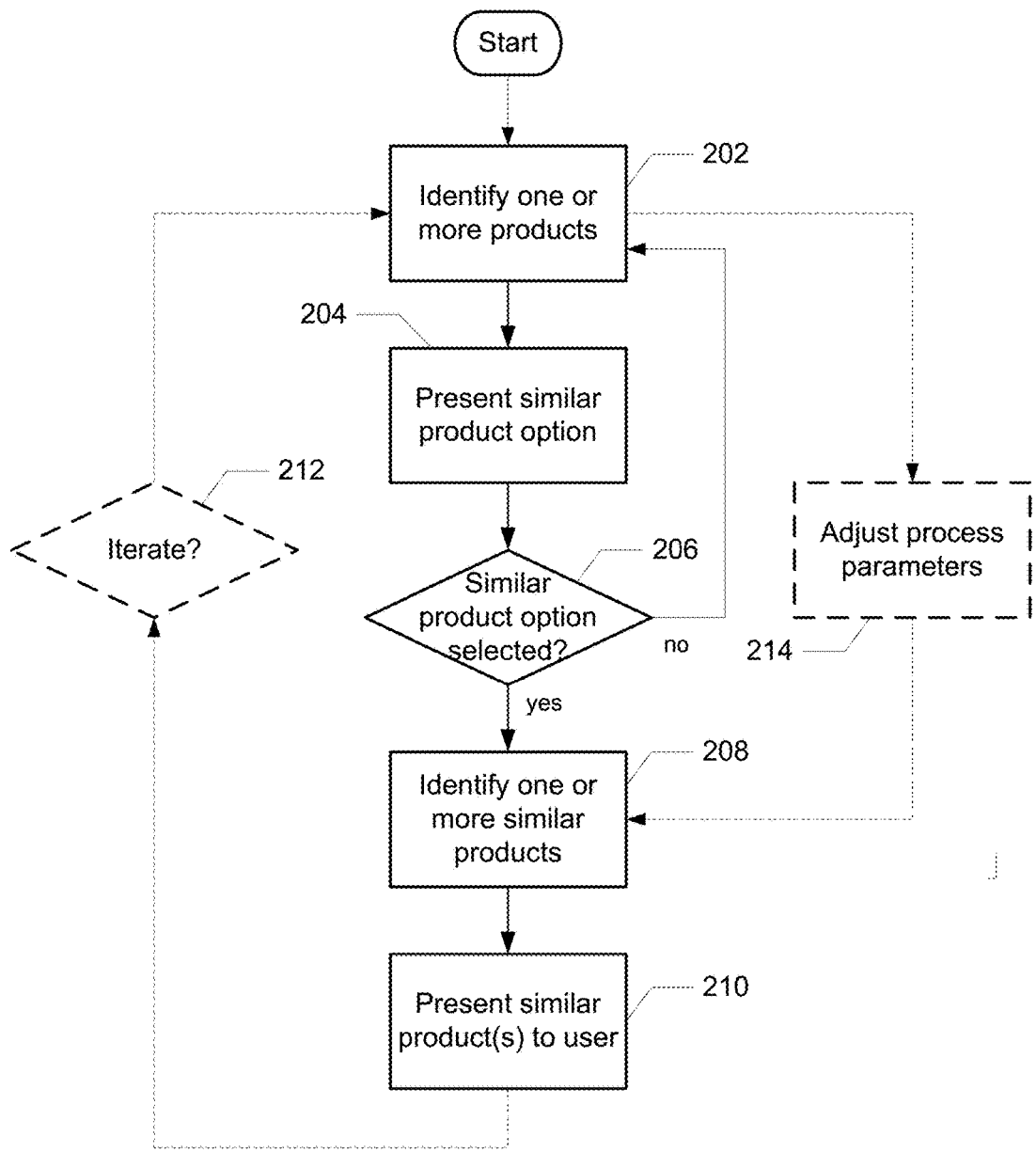
FIG. 2 illustrates an example of a process for making product recommendations.

Service 102 may be, for example, an e-commerce service, e.g., an online retailer, shopping service, or auction site, with which consumers may purchase products or services. As with conventional services, service 102 may include various types of logic and interfaces with which users may search for and purchase products (not shown for clarity). In addition, service 102 includes product recommendation logic 110 configured to identify one or more products (represented in associated data store 112) with reference to actions taken by, or preferences expressed by or associated with a particular user, and to identify one or more similar products (also represented in data store 112) as described herein, e.g., for presentation to the user as recommended products. It should be noted that, while product recommendation logic 110 and product data store 112 are both shown as part of service 102, implementations are contemplated in which either or both operate remotely from service 102, and/or either or both are under the control of an independent entity. A flowchart illustrating the operation of a particular implementation of product recommendation logic is shown in FIG. 2.

A set of one or more reference products is identified (202) to serve as the basis by which similar products are identified. The manner in which the set of one or more products is identified may vary considerably depending on the application. For example, the user might perform a product search which returns search results including the one or more products. Alternatively, the user might browse a product catalog and express interest in a particular product or category by viewing more detailed information about that product or category. FIG. 1 illustrates an example in which a user associated with device 106-5 is viewing information about a particular tablet. As another alternative, a recent purchase of a product by the user may be used to identify that product or a category of products. Still another alternative might be an expression of approval of a product in an online forum or community. These examples should serve to illustrate the great diversity of ways in which the reference product set may be identified.

An option to receive information about products similar to the reference product set is presented to the user (204). The option may be presented in a variety of forms such as, for example, an interface control (e.g., button or link), or a voice prompt (e.g., "Would you like to see similar products?"). One form of presenting the option is represented in FIG. 1 by "Find Similar" button 114 on the screen of device 106-5. If the user selects the option (206), e.g., by selecting button 114, one or more similar products are identified (208), and information relating to the one or more similar products is presented to the user (210). The information presented may take a wide variety of forms such as, for example, a representation of each similar product that may include an image of the product, summary information, detailed specifications, etc. If the user does not select the option (206), the process may attempt to identify a different set of reference products or, alternatively, may terminate (not shown).

According to a particular class of implementations, similar products are identified with reference to distances between the end points of vectors representing products in a vector space, e.g., a Euclidean vector space. This may be understood with reference to the diagram of FIG. 3 in which 8 products are represented by vectors in a two-dimensional vector space. Each vector (e.g., 302) begins at the origin and terminates at point representing a pair of values that, in turn, represent two product attributes for the corresponding product; Product Attribute 1 plotted along the y-axis and Product Attribute 2 plotted along the x-axis). The values in each vector may be representative of numeric attributes of the products in the real world (e.g., physical dimensions, weight, performance, price, product rating, popularity of product, retailer, or manufacturer, storage capacity, screen resolution or pixel density, startup delay, number of a particular feature (e.g., speakers), etc.). However, non-numeric product attributes (e.g., color, retailer, manufacturer, whether the product includes a particular feature, etc.) may also be represented in product vectors. Values to non-numeric attributes may be assigned arbitrarily, or according to schemes which model relatedness of different presentations for a particular attribute. For example, colors might be represented by values corresponding to coordinates on a multi-dimensional color map in which color intensity and shade are blended with the order of the spectrum of visible light. Other examples will be apparent to those of skill in the art. The product vector data may be stored, for example, in a product data store such as, for example data store 112 of FIG. 1.

Identification of similar products may be accomplished in such a vector space in a variety of ways. For example, if the reference product set includes just a single product, e.g., Product 1 of FIG. 3, similar products may be identified as including all products having product vector end points within some programmable distance of the end point of the product vector representing Product 1. Distances between the product vector end point for Product 1 and each of the other product vector end points could be calculated to determine whether any lie within the programmable distance of Product 1, e.g., the distance defined by circle 304. If, as shown, no other products have vector end points within that distance, the distance can be increased, e.g., as represented by circle 306 in which Products 5, 7 and 8 are included. Alternatively, the programmable distance may remain static during execution of the process with the result that no similar products are identified. According to some implementations, the option of seeing similar products is not even presented to the user unless it is previously determined that similar products exist.

Figure 3:
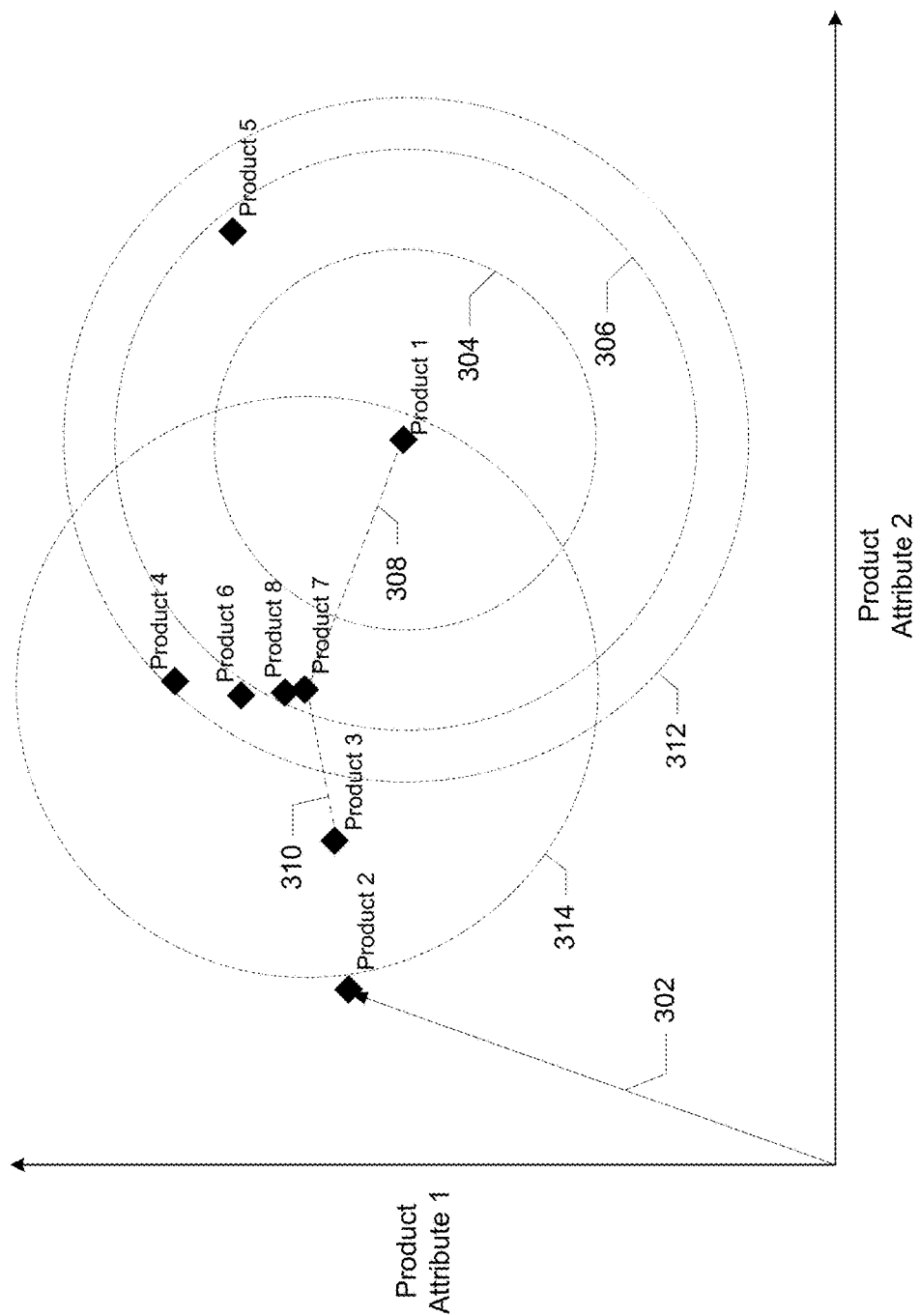
FIG. 3 illustrates representations of products in an example of a product vector space.

According to an alternative approach, the m closest products may be identified, where m represents a programmable natural number, i.e., one or more. Referring to FIG. 3 and using Product 1 as the reference product set, if m=3, the identified similar products would again be Products 5, 7 and 8. Such implementations may enforce a limit on the distance a similar product may be from the reference set in order to ensure that the user is not presented with products that are too dissimilar. It should also be noted that while a two-dimensional vector space is illustrated in FIG. 3 and described in the examples above and below, the related concepts may be generalized to n dimensions. That is, implementations are contemplated in which the number of attributes in each product vector may be expanded to suit the particular application, product category, computational budget, etc.

Approaches to identifying similar products are also contemplated in which the reference product set includes more than one product. This may be understood with reference to FIG. 3. In this example, the reference product set includes Products 1 and 3. The distances between the end points for each of the vectors for Products 1 and 3 and each of the other products is calculated, and these distances are then combined (e.g., added or multiplied together) to identify similar products as the products having vector end points that are close to those for the vectors of both Products 1 and 3. As can be seen in FIG. 3, the product vector end point closest to both Products 1 and 3 is the one corresponding to Product 7, e.g., the sum or product of the distances 308 and 310 would be the smallest. Products 8 and 6, respectively, have product vector end points that make them the second and third closest to the reference set. As with a reference product set of one, a reference product set having multiple product vectors can be used to identify other products within some predetermined distance or, alternatively, identify the closest m products. Further, the reference product set may be generalized beyond two products to an arbitrary number of products (while, of course, taking computing performance considerations into account). In addition, the degree to which the products in the reference product set are similar (e.g., as determined by the distances between the product vector end points in the reference set) can be used to determine the distance within which similar products must be.

As should be apparent with reference to the foregoing description, the degree to which products are considered "similar" may vary considerably depending on any of a variety of factors including, for example, the type of product, particular product attributes, expressed or inferred preferences of a user, how crowded or sparse the market is for a given product type, the manufacturer(s), retailer(s), or supplier(s) for a given product, etc. Similarity may also depend on human input, e.g., the attributes selected for representation for a given product or product type, the weights assigned to particular attributes, a threshold distance beyond which products are not considered similar, etc. Similarity may also depend on the particular method employed for identifying products in a vector space relative to one or more reference products, e.g., the nearest products vs. products within a specified radius. The scope of the invention should therefore not be limited to definitions of the term "similar" that do not contemplate such ranges of possibility.

Moreover, the distances between product vector end points need not be calculated in real-time. That is, while implementations are contemplated in which distance calculations occur closely in time with the user's selection of the similar products option, other implementations are contemplated in which at least some distance calculations are performed and stored ahead of time (e.g., in product data store 112). In fact, according to some implementations, the product vector data themselves need not be stored or available to the product recommendation logic at run time, i.e., as long as the distances between product vector end points and/or representations of those distances are available, recommendations of similar products based on the distance calculations may be made.

According to a particular implementation, the distance d between the end points of two product vectors p and q is determined by:

$$d(p, q) = d(q, p) = \sqrt{\sum_{i=1}^{n} (q_i - p_i)^2},$$

where values $p_1$ through $p_n$ represent the n values of product vector p, and values $q_1$ through $q_n$ represent the n values of product vector q. These values may be used as discussed above to identify similar products for recommendation to users.

Referring again to FIGS. 2 and 3, the process by which similar products are identified and presented to a user may be an iterative one (212) in which the option to find similar products may be presented to the user multiple times as she proceeds through different contexts and/or takes various actions. For example, after information relating to Products 5, 7 and 8 has been provided (or in conjunction with that information), the user may again be provided with the option to see additional similar products. These additional similar products may be identified relative to Product 1 by, for example, expanding the distance from Product 1 (as represented by circle 312), or by identifying the next k nearest products; in this example, k=2 thereby resulting in the identification of Products 4 and 6.

Alternatively, the reference product set on which the distance calculations are based may be changed for a subsequent iteration. For example, if the user had been presented with information about Product 7 in a previous iteration and had navigated to a product details page for that product, it may be assumed that the user has a particular interest in Product 7, and that product might then be included in the reference product set for the subsequent iteration. In some instances, it might be added to the previous set (e.g., the set could now include both Products 1 and 7 as discussed above with reference to Products 1 and 3). Alternatively, the new product could replace an existing product in the reference set (e.g., Product 7 could replace Product 1). The latter alternative is represented in FIG. 3 by circle 314 centered on Product 7 and encompassing Products 1, 3, 4, 6 and 8. According to another alternative, if the user didn't select any of the similar products to view in a particular iteration, then a subsequent iteration might not use any of those products to identify further products, e.g., it might use the original reference product set and continue to expand out from there until the user shows interest in one or more of the new products identified.

According to some implementations, process parameters, e.g., the parameters on which distance calculations are based, may be modified (214 of FIG. 2), e.g., in response to user actions to affect calculations for successive iterations. For example, each parameter value in each product vector may have an associated weight which may be modified in response to such user actions, thereby changing the location of the vector end point in the vector space. The user actions might be actions which indicate an interest or preference for a particular product or set of products from which it may be inferred that a particular product feature is important, e.g., if the user has been viewing product details for products of a particular size, color, price, rating, manufacturer, etc. The weights associated with those product attribute values may be increased to correspondingly increase their respective contributions to the distance calculations, thereby emphasizing the those product features. In another example, if the user selects a particular one of the similar products presented and the selected product is very similar to the original product(s) in one or more specific attributes, those attributes could be weighted more heavily for subsequent iterations. Alternatively, or additionally, attribute value weights might be similarly reduced for product attributes in which the user appears not to have an interest or explicitly indicates that the product is not of interest (e.g., a thumbs down rating), thereby deemphasizing the contributions of those attributes.

The initial weights associated with the attribute values of product vectors may be manually assigned in a human-curated process, e.g., based on market research or a common sense understanding of what consumers care about for a given product category. Alternatively, the weights may be determined and assigned with reference to the reference product set itself. For example, if the user is looking at a product comparison page, the similarities between the products on that page could be used to identify and emphasize (or deemphasize) attribute values for the subsequent distance calculations.

The greater the number of attributes represented in product vectors, the more product information can be represented, thereby enhancing the possibility of yielding better results. However, as the number of attributes increases, computing performance may become an issue. For some implementations, a fixed vector size may be desired which strikes an appropriate balance between these competing interests. However, implementations are contemplated in which the number of attributes used to calculate the distance between product vector end points may change dynamically, e.g., in response to user actions.

For example, if a user's action indicates that a specific product attribute is of interest, and that attribute was not included in the product vectors used in previous calculation, a new set of vectors may be constructed which adds the new attribute or replaces an existing attribute with the new attribute. Addition of a new attribute may be done by expanding the vector size. Similarly, removing an attribute may be done by decreasing the vector size. Alternatively, a fixed size vector may be employed that includes positions for each of a superset of attributes in the system database but with some attribute positions masked or set to zero so that they do not have an effect on the distance calculations. When a user action indicates that such an attribute is important, it can be unmasked and/or set to a non-zero value for the next iteration. Alternatively, if it becomes clear that a particular attribute is not useful, that attribute could be masked or set to zero to improve performance.

Product vectors might be uniform over a range of product categories to promote a standard representation of products. Alternatively, groups of product vectors may be isolated within relatively narrow product categories to ensure that relevant product attributes may be represented and/or emphasized. The appropriate balance between these considerations will depend on the application and the nature of the products represented.

User actions or preferences might also be used to adjust process parameters (e.g., 214 of FIG. 2) that affect the ranking and presentation of the m closest products. That is, instead of modifying the distance calculations, the products might be ordered by distance and the ordering might change based on additional information. For example, ordered by distance, the five closest products to Product 1 in FIG. 3 are Product 7, Product 5, Product 8, Product 6 and Product 4. These products may be ranked and presented in that order. Alternatively, the ordering or ranking of the products may be altered to take into account the fact that the user had previously browsed detailed product information for Product 8, or has an expressed preference for the manufacturer or retailer associated with Product 4. The wide variety of information on which such a re-ordering may be based will be apparent to those of skill in the art.

When a user selects the option to receive information about similar products, the information presented may vary considerably without departing from the scope of this disclosure. For example, if the user is viewing the product details page of a particular product, the similar products that are identified might be presented in a product comparison page including the original product in a side by side comparison with the similar products highlighting relevant features as informed, for example, by the product vector attribute values themselves. Alternatively, a list of links (e.g., organized like search results) could be provided, each leading to a product detail page for the corresponding similar product. Those of skill in the art will appreciate the diversity of ways in which similar product information may be presented.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method for making product recommendations in a computing network, comprising:
   identifying, using one or more computing devices operating in the network, a reference product set based in part on one or more actions of a user associated with a remote device, the reference product set including a first product and a second product, wherein the one or more actions include one or more of viewing information representing the first and/or second product on the remote device, selecting the first and/or second product on the remote device, or purchasing the first and/or second product;
   transmitting, using the one or more computing devices, a first product interface control for presentation on the remote device;
   receiving, using the one or more computing devices, first selection data representing activation of the first product interface control from the remote device;
   retrieving, using the one or more computing devices, a first product vector associated with the first product from a data store in response to the first selection data, the first product vector comprising a first plurality of values corresponding to a plurality of product attributes, the plurality of product attributes defining a vector space, the first plurality of values defining a first point in the vector space;
   retrieving, using the one or more computing devices, a second product vector associated with the second product from the data store in response to the first selection data, the second product vector comprising a second plurality of values corresponding to the plurality of product attributes, the second plurality of values defining a second point in the vector space;
   identifying a third point in the vector space, the third point representing a third product having an associated third product vector, the third product vector comprising a third plurality of values corresponding to the plurality of product attributes, the third plurality of values defining the third point in the vector space, the third product not being in the reference product set;
   determining, using the one or more computing devices, that the third product is similar to the reference product set by:
      calculating a first Euclidean distance between the first point and the third point in the vector space;
      calculating a second Euclidean distance between the second point and the third point in the vector space;
      determining a degree to which the first product and the second product in the reference product set are similar by determining a third Euclidean distance between the first point and the second point;
      determining, based on the third Euclidean distance, a programmable threshold Euclidean distance for the reference product set beyond which products not in the reference product set are not considered similar to the reference product set; and
      determining a sum of the first Euclidean distance and the second Euclidean distance;
      determining that the sum of the first Euclidean distance and the second Euclidean distance is within the programmable threshold Euclidean distance for the reference product set;
   generating a detail page that includes the first product in the reference product set, the second product in the reference product set, and the third product; and
   transmitting, using the one or more computing devices, information representing the detail page for presentation on the remote device, thereby indicating that the third product is a recommended product based on the reference product set.

2. The method of claim 1, further comprising:
including the third product in the reference product set;
transmitting a second product interface control for presentation on the remote device;
receiving second selection data representing activation of the second product interface control from the remote device;
identifying a fourth product having an associated fourth product vector in response to the second selection data, the fourth product vector comprising a fourth plurality of values corresponding to the plurality of product attributes, the fourth plurality of values defining a fourth point in the vector space, wherein identifying the fourth product includes:
calculating a fourth distance between the first point and the fourth point in the vector space;
calculating a fifth distance between the second point and the fourth point in the vector space;
calculating a sixth distance between the third point and the fourth point in the vector space; and
identifying the fourth product based on the fourth distance, fifth distance, and the sixth distance.

3. The method of claim 1, further comprising identifying the second product in the reference product set based on a distance between the first point in the vector space and the second point in the vector space.

4. A computer-implemented method for making product recommendations in a computing network, comprising:
identifying a first reference product set based in part on one or more actions of a user associated with a remote device operating in the network, the first reference product set including a first product and a second product, wherein:
the first product is associated with a first product vector, the first product vector comprising a first plurality of values corresponding to a plurality of product attributes, the plurality of product attributes defining a vector space, the first plurality of values defining a first point in the vector space; and
the second product is associated with a second product vector, the second product vector comprising a second plurality of values corresponding to the plurality of product attributes, the second plurality of values defining a second point in the vector space;
identifying a third point in the vector space, the third point representing a third product having an associated third product vector, the third product vector comprising a third plurality of values corresponding to the plurality of product attributes, the third plurality of values defining the third point in the vector space, the third product not being in the first reference product set;
determining that the third product is similar to the first reference product set by:
calculating a first distance between the first point and the third point in the vector space;
calculating a second distance between the second point and the third point in the vector space;
determining a degree to which the first product and the second product in the first reference product set are similar by determining a third distance between the first point and the second point;
determining, based on the third distance, a programmable threshold distance for the first reference product set beyond which products not in the first reference product set are not considered similar to the first reference product set; and
determining that a combination of the first distance and the second distance is within the programmable threshold distance for the first reference product set;
generating a detail page that includes the first product in the reference product set, the second product in the reference product set, and the third product; and
transmitting, information representing the detail page for presentation on the remote device, thereby indicating that the third product is a recommended product based on the first reference product set.

5. The method of claim 4, further comprising retrieving the first product vector from a data store, the data store having a plurality of product vectors stored therein including the first and second product vectors, and identifying the second product in the reference product set by calculating a third distance between the first point in the vector space and the second point in the vector space.

6. The method of claim 4, wherein the first plurality of values of the first product vector includes a first set of n values, $p_1$ through $p_n$, and wherein the third plurality of values of the third product vector includes a second set of n values, $q_1$ through $q_n$, and wherein the first distance between the first point and the third point is based at least in part on $$\sqrt{\sum_{i=1}^{n}(q_i - p_i)^2}.$$

7. The method of claim 4, further comprising adjusting one or more weights for each of a plurality of product vectors including the first and second product vectors in response to an action taken by the user on the remote device relating to one or both of the first and second products, and identifying one or more additional products using the adjusted weights.

8. The method of claim 7, wherein each of the one or more weights for each of the plurality of product vectors corresponds to one of the plurality of product attributes represented in the corresponding product vector, wherein the action taken by the user on the remote device relating to one or both of the first and second products indicates an interest of the user in one or more of the plurality of product attributes corresponding to the one or more weights, and wherein adjusting the one or more weights emphasizes the corresponding product attributes in identifying the one or more additional products.

9. The method of claim 4, further comprising identifying a fourth product having an associated fourth product vector, the fourth product vector comprising a fourth plurality of values corresponding to the plurality of product attributes, the fourth plurality of values defining a fourth point in the vector space, wherein identifying the fourth product includes:
calculating a fourth distance between the first point and the fourth point in the vector space;
identifying the fourth product based on at least the fourth distance;
wherein the first distance between the first point and the third point and the second distance between the second point and the third point are calculated based on a first subset of the plurality of product attributes, and the fourth distance between the first point and the fourth point is calculated based on a second subset of the plurality of product attributes, and wherein, without applying weights, the first subset of the plurality of product attributes is different from the second subset of the plurality of product attributes.

10. The method of claim 4, further comprising identifying a fourth product having an associated fourth product vector, the fourth product vector comprising a fourth plurality of values corresponding to the plurality of product attributes, the fourth plurality of values defining a fourth point in the vector space, wherein identifying the fourth product includes:
   calculating a fourth distance between the first point and the fourth point in the vector space;
   calculating a fifth distance between the second point and the fourth point in the vector space;
   calculating a sixth distance between the third point and the fourth point in the vector space; and
   identifying the fourth product based on the fourth distance, fifth distance, and the sixth distance.

11. The method of claim 4, further comprising receiving data representing the one or more actions of the user, the received data representing one or more of display of information representing the first product on the remote device, activation of an interface control associated with the first product on the remote device, or purchase of the first product.

12. The method of claim 4, wherein the values representing the plurality of product attributes for each of the product vectors include one or both of a first numeric value proportional to a real-world specification of a corresponding product, and a second numeric value assigned to represent a non-numeric attribute of the corresponding product.

13. A system for making product recommendations in a computing network, the system comprising memory and one or more processors configured to:
   identify a first reference product set based in part on one or more actions of a user associated with a remote device operating in the network, the first reference product set including a first product in the second product, wherein:
      the first product is associated with a first product vector, the first product vector comprising a first plurality of values corresponding to a plurality of product attributes, the plurality of product attributes defining a vector space, the first plurality of values defining a first point in the vector space; and
      the second product is associated with a second product vector, the second product vector comprising a second plurality of values corresponding to the plurality of product attributes, the second plurality of values defining a second point in the vector space;
   identify a third point in the vector space, the third point representing a third product having an associated third product vector, the third product vector comprising a third plurality of values corresponding to the plurality of product attributes, the third plurality of values defining the third point in the vector space, the third product not being in the first reference product set;
   determine that the third product is similar to the first reference product set by:
      calculating a first distance between the first point and the third point in the vector space;
      calculating a second distance between the second point and the third point in the vector space;
      determining a degree to which the first product and the second product in the first reference product set are similar by determining a third distance between the first point and the second point;
      determining, based on the third distance, a programmable threshold distance for the first reference product set beyond which products not in the first reference product set are not considered similar to the first reference product set; and
      determining that a combination of the first distance and the second distance is within the programmable threshold distance for the first reference product set;
   generate a detail page that includes the reference products along with the recommended products
   transmit, in response to determining that the combination of the first distance and the second distance is within the threshold distance for the first reference product set, information representing the third product from the one or more computing devices for presentation on the remote device, thereby indicating that the third product is a recommended product based on the first reference product set.

14. The system of claim 13, wherein the memory and the one or more processors are further configured to retrieve the first product vector from a data store, the data store having a plurality of product vectors stored therein including the first and second product vectors, and wherein the memory and the one or more processors are further configured to identify the second product in the reference product based in part on calculating a third distance between the first point in the vector space and the second point in the vector space.

15. The system of claim 13, wherein the first plurality of values of the first product vector includes a first set of n values, $p_1$ through $p_n$, and wherein the third plurality of values of the third product vector includes a second set of n values, $q_1$ through $q_n$, and wherein the first distance between the first point and the third point is based at least in part on $$\sqrt{\sum_{i=1}^{n} (q_i - p_i)^2}.$$

16. The system of claim 13, wherein the memory and the one or more processors are further configured to adjust one or more weights for each of a plurality of product vectors including the first and second product vectors in response to an action taken by the user on the remote device relating to one or both of the first and second products, and identify one or more additional products using the adjusted weights.

17. The system of claim 16, wherein each of the one or more weights for each of the plurality of product vectors corresponds to one of the plurality of product attributes represented in the corresponding product vector, wherein the action taken by the user on the remote device relating to one or both of the first and second products indicates an interest of the user in one or more of the plurality of product attributes corresponding to the one or more weights, and wherein the memory and the one or more processors are configured to adjust the one or more weights to emphasize the corresponding product attributes in identifying the one or more additional products.

18. The system of claim 13, wherein the memory and the one or more processors are further configured to identify a fourth product having an associated fourth product vector, the fourth product vector comprising a fourth plurality of values corresponding to the plurality of product attributes, the fourth plurality of values defining a fourth point in the vector space, wherein identifying the fourth product includes:

calculating a fourth distance between the first point and the fourth point in the vector space;

identifying the fourth product based on at least the fourth distance;

wherein the first distance between the first point and the third point and the second distance between the second point and the third point are calculated based on a first subset of the plurality of product attributes, and the fourth distance between the first point and the fourth point is calculated based on a second subset of the plurality of product attributes, and wherein, without applying weights, the first subset of the plurality of product attributes is different from the second subset of the plurality of product attributes.

19. The system of claim 13, wherein the memory and the one or more processors are further configured to identify a fourth product having an associated fourth product vector, the fourth product vector comprising a fourth plurality of values corresponding to the plurality of product attributes, the fourth plurality of values defining a fourth point in the vector space, wherein identifying the fourth product includes:

calculating a fourth distance between the first point and the fourth point in the vector space;

calculating a fifth distance between the second point and the fourth point in the vector space;

calculating a sixth distance between the third point and the fourth point in the vector space; and identifying the fourth product based on the fourth distance, fifth distance, and the sixth distance.

20. The system of claim 13, wherein the memory and the one or more processors are further configured to receive data representing the one or more actions of the user, the received data representing one or more of display of information representing the first product on the remote device, activation of an interface control associated with the first product on the remote device, or purchase of the first product.

21. The system of claim 13, wherein the values representing the plurality of product attributes for each of the product vectors include one or both of a first numeric value proportional to a real-world specification of a corresponding product, and a second numeric value assigned to represent a non-numeric attribute of the corresponding product.

22. The method of claim 1, further comprising:

transmitting, in response to determining that the sum of the first Euclidean distance and the second Euclidean distance is within the threshold distance for the reference product set, information representing an interface control for display, wherein generating the detail page is in response to receiving an indication of selection of the interface control.

23. The method of claim 4, further comprising:

transmitting, in response to determining that the sum of the first distance and the second distance is within the threshold distance for the reference product set, information representing an interface control for display, wherein generating the detail page is in response to receiving an indication of selection of the interface control.

24. The system of claim 13, wherein the memory and the one or more processors are further configured to transmit, in response to determining that the sum of the first distance and the second distance is within the threshold distance for the reference product set, information representing an interface control for display, wherein generating the detail page is in response to receiving an indication of selection of the interface control.

* * * * *